United States Patent [19]

French et al.

[11] 4,276,112
[45] Jun. 30, 1981

[54] INDIVIDUALIZED LABEL APPLICATION SYSTEM

[75] Inventors: John B. French, Fountain Valley; Oscar E. Muttoni, Huntington Beach, both of Calif.

[73] Assignee: Nomax Corporation, Santa Ana, Calif.

[21] Appl. No.: 967,263

[22] Filed: Dec. 7, 1978

[51] Int. Cl.³ .............................................. G01G 23/38
[52] U.S. Cl. .................................... 156/360; 101/35; 101/228; 101/288; 101/DIG. 13; 156/384; 156/497; 156/542; 177/4
[58] Field of Search ............... 156/360, 540, 384, 542, 156/541, 539, 497, 568; 101/DIG. 13, 35, 288, 291, 292, 228, 66; 177/4

[56] References Cited

U.S. PATENT DOCUMENTS

| | | | |
|---|---|---|---|
| 1,936,068 | 11/1933 | Marquardt | 101/228 X |
| 2,824,736 | 2/1958 | Allen | 101/288 X |
| 2,845,021 | 7/1958 | Pinckert et al. | 101/228 |
| 2,948,466 | 8/1960 | Allen et al. | 156/360 X |
| 3,257,222 | 6/1966 | Carlson | 101/DIG. 13 |
| 3,372,079 | 3/1968 | Fellner et al. | 156/360 |
| 3,384,524 | 5/1968 | Hansen, Jr. | 156/360 |
| 3,461,984 | 8/1969 | Phillips et al. | 156/360 X |
| 3,555,764 | 1/1971 | Dowling | 156/568 X |
| 3,657,051 | 4/1972 | McCarthy | 101/292 X |
| 3,731,317 | 5/1973 | De Bruyne | 346/136 X |
| 3,861,303 | 1/1975 | Dorn, Jr. | 101/66 X |
| 3,961,574 | 6/1976 | Fotland | 101/DIG. 13 |
| 3,985,605 | 10/1976 | Treiber et al. | 156/384 |
| 3,989,577 | 11/1976 | Watson | 156/497 X |
| 4,088,891 | 5/1978 | Smith et al. | 250/315.1 |
| 4,094,244 | 6/1978 | Edwards | 101/66 |

FOREIGN PATENT DOCUMENTS 2153443 7/1973 Fed. Rep. of Germany ........... 400/119

Primary Examiner—Clifford D. Crowder
Attorney, Agent, or Firm—Poms, Smith, Lande & Rose

[57] ABSTRACT

A system is provided which weighs packages and applies individualized labels to each package indicating the weight of the package, the date, or other desired individualized information. A conveyor includes a weighing section where the weight of the product is converted into digital form and supplied to a data processing system. Individual labels are printed by electrostatic techniques including both bar code machine readable designations and alpha-numeric characters. The label printing and applying apparatus includes a print station, a toner application station, a fusing station, and a peeling blade for separating the label from the backing sheet, and an applicator station. As the individual labels are advanced to the applicator station, blank labels will pass under the print and toner stations, and these labels will not be charged or toned, so that the tape may be reversed and moved back to the appropriate position for applying individualized data to these blank labels. Photocell control circuits provide loops between the supply and the take-up reels and the label preparation stations, to facilitate rapid forward and reverse movement of the labels as they are printed and applied. Fusing of the toner is accomplished with a simple heated platen below the backing sheet, which fuses the toner prior to the label being peeled and applied to the product.

5 Claims, 7 Drawing Figures

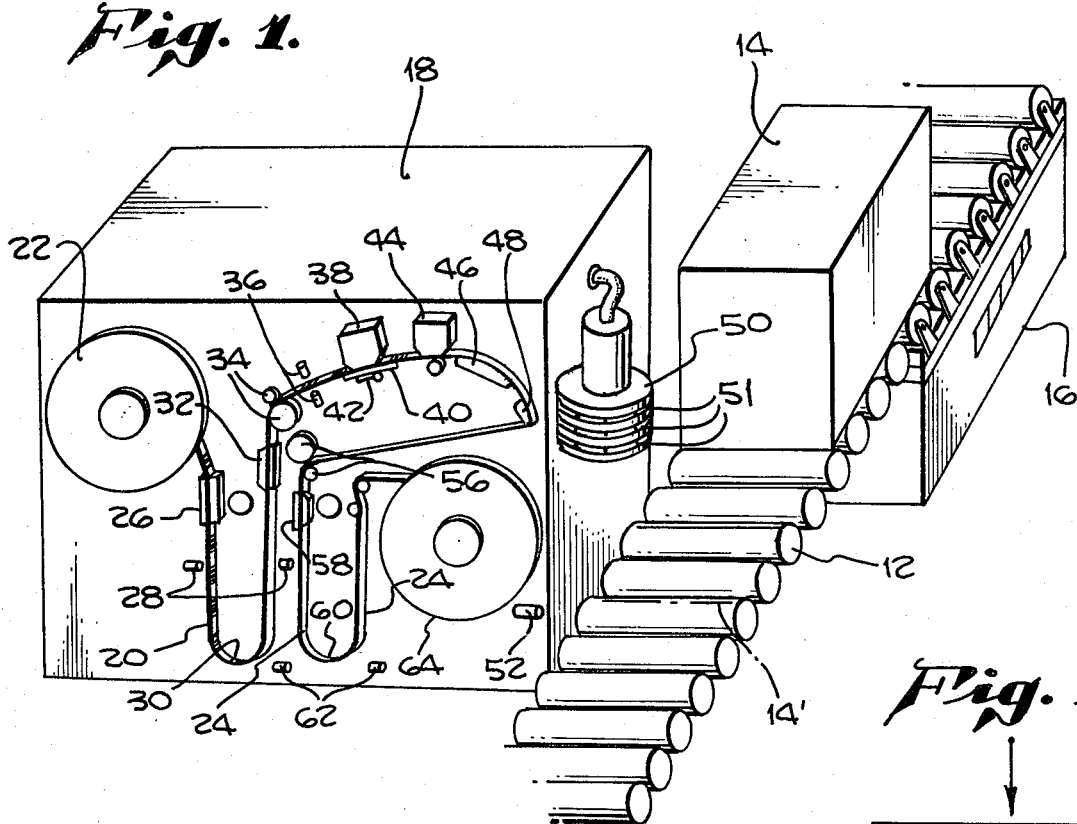
Fig. 1.
Fig. 1a.
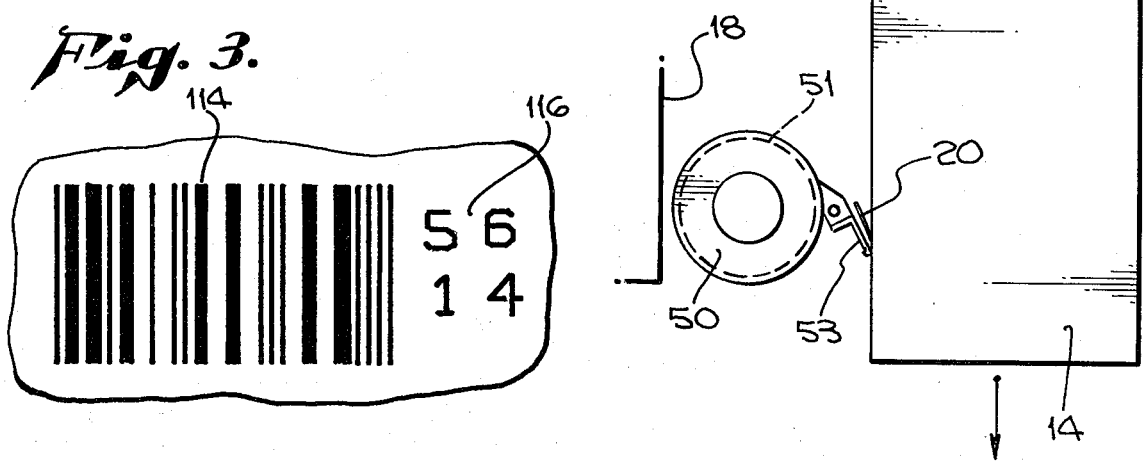
Fig. 3.
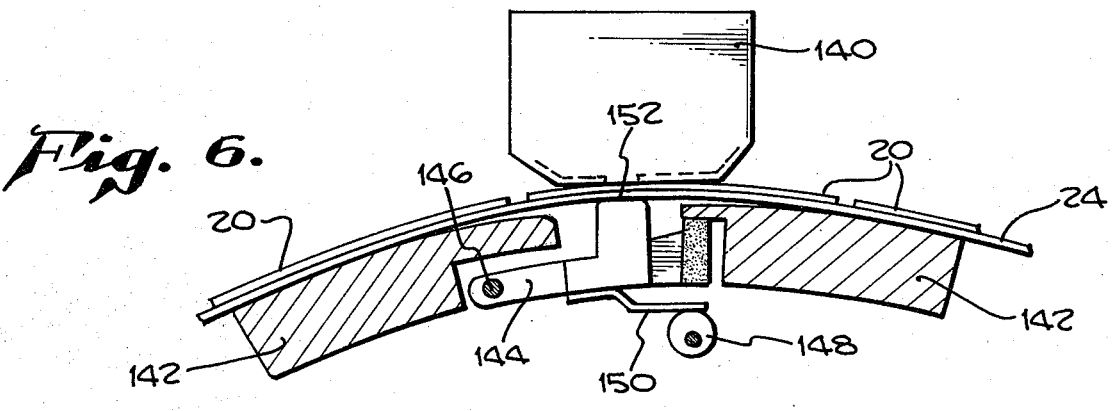
Fig. 6.

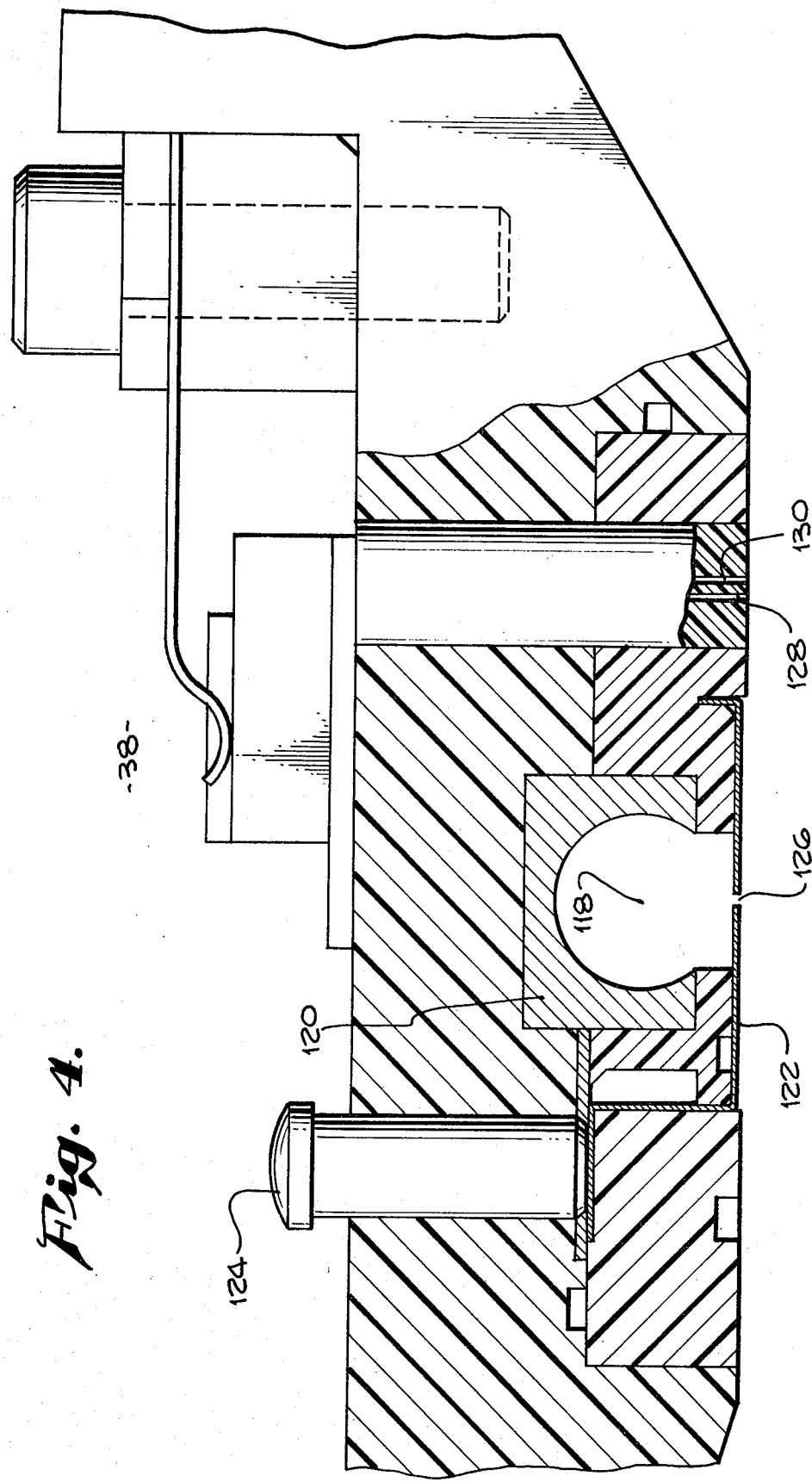

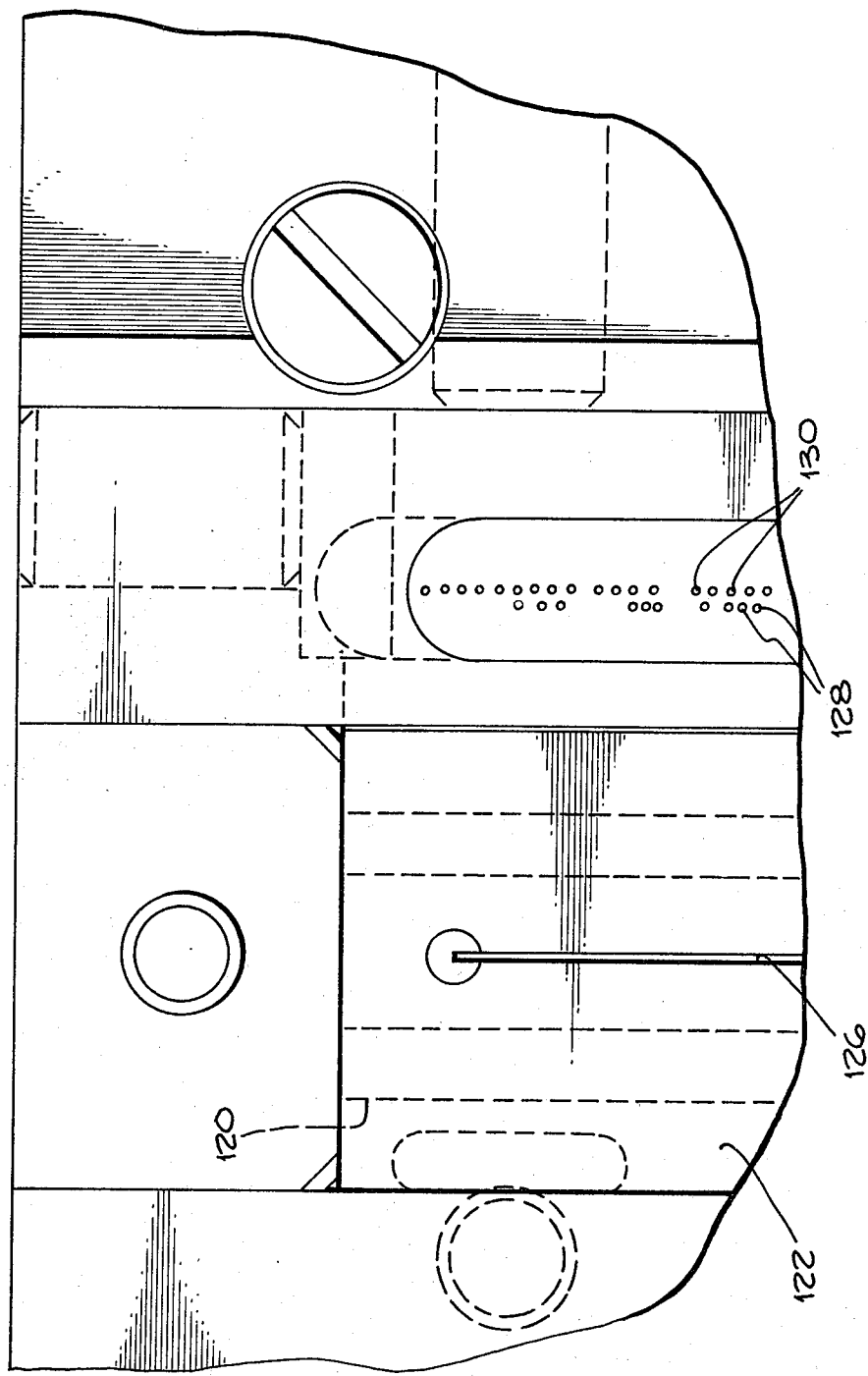

INDIVIDUALIZED LABEL APPLICATION SYSTEM

FIELD OF THE INVENTION

The present invention relates to a labeling machine, and more particularly to labeling apparatus in which electrostatic printing is employed.

BACKGROUND OF THE INVENTION

It has previously been proposed to make labels electrostatically, but some considerable difficulties have been encountered in "one-on-one" labels in which each label must differ from the next preceding label. The type of application utilizing this mode includes labels indicating the weight of the product which is within the package or some other quality of the product which changes with time or with other parameters, such as the expiration date on perishables. One of the problems involved is the fact that the normal electrostatic printing process requires a distance which is greater than the length of a label. Therefore, by the time special and individual information has been printed on a particular label and applied to the product, one or two additional labels may be part way through the label preparation stations.

Accordingly, a principal object of the present invention is to provide a system for the continuous printing of individual labels which are of the self-adhesive type and which are mounted in the usual die-cut style with the labels adjacent one another, but slightly spaced apart, and to apply these labels on a "one-to-one" basis to products requiring individualized labels.

SUMMARY OF THE INVENTION

In accordance with the present invention, an electrostatic printing system is provided for the preparation of individualized labels by apparatus including arrangements for electrostatically printing, toning, fusing, and applying a label from a continuous web to a product, and then moving the web in the reverse direction preparatory to accomplishing the same sequence of steps in the preparation and application of a new individualized label for the next successive product.

In accordance with a subordinate feature of the invention, loops are maintained at the input to the label printing and applying apparatus and between the output from the label printing and applying apparatus and the take-up reel for the web, by the use of photocell sensors and associated servo-systems for the supply and the take-up reels.

In accordance with another aspect of the invention, the electrostatic print-head may be provided with first electrostatic arrangements for printing a bar code, and second coextensive arrangements for printing alphanumeric information on adjacent vertically extending areas of the label, without interference between the two electrostatic printing arrangements, and the resulting charge pattern may be toned and fused concurrently.

In accordance with another subordinate feature of the invention, arrangements may be provided for advancing the moving web which carries the labels toward or away from the electrostatic printing heads and the toner to prevent the application of charge pattern or toner material to labels or to the web during those portions of the cycle when such action is not desired.

Another aspect of the invention involves the use of a rotating cylindrical vacuum label applicator, by which the peeled labels are held on the outer surface of the grooved roller, and rotated to a position adjacent the products where fingers extending into the grooves separate the labels from the outer surface of the cylinder, and apply the labels to the products.

Other objects, features, and advantages of the invention will become apparent from a consideration of the following detailed description and from the drawings.

BRIEF DESCRIPTION OF THE DRAWINGS

FIG. 1 is a schematic showing of an illustrative embodiment of the invention, and FIG. 1A is a fragmentary view of one portion of the system of FIG. 1;

FIG. 3 shows a sample label as printed by the present system;

FIG. 4 is a partial cross-sectional view of the electrostatic printer employed in the system of Figure one;

FIG. 5 is a bottom view of the electrostatic printer of FIG. 4; and

FIG. 6 shows a cam actuated riser for insuring full contact of the labels with the print head and the toner unit of FIG. 1.

DETAILED DESCRIPTION

Figure 2:
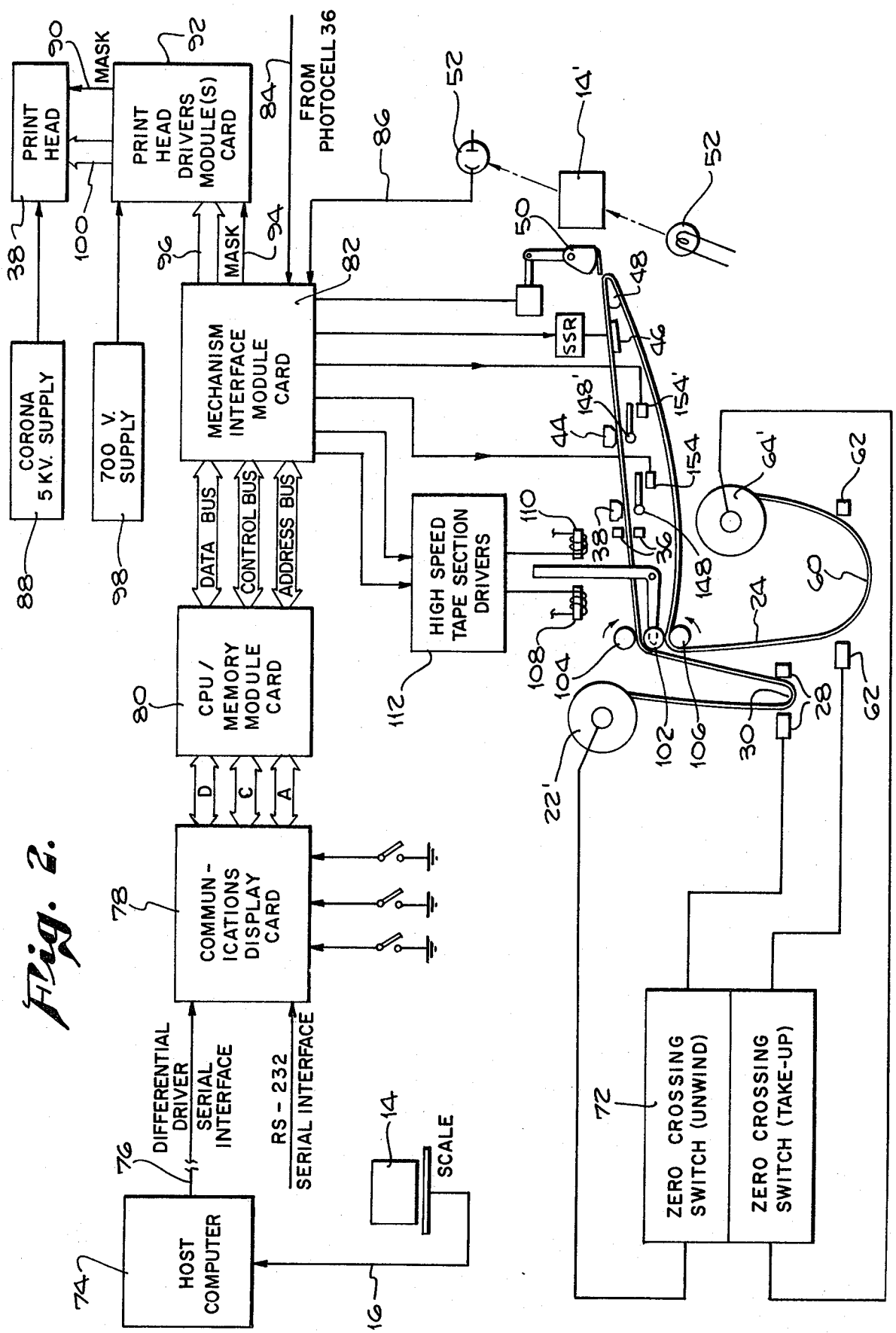
FIG. 2 is a block circuit diagram showing the electronics employed in operating the system of FIG. 1.

With reference to the drawings, FIG. 1 shows a conveyor 12 on which a product carton 14 is moving from the right rear to the lower left, as shown in FIG. 1. A section of the conveyor 12 includes a scale 16 on which the product 14 is weighed prior to moving to the position shown in FIG. 1. The unit 18 prepares a special label which includes information indicating the weight of the product 14, and applies this label to the carton 14 when it moves forward to a position such as that indicated in dashed lines in FIG. 1 by the reference numeral 14'. The system of the present invention will be considered both from the mechanical and physical standpoint on the basis of FIG. 1, and from the electrical and microprocessor implementation standpoint, as set forth in connection with FIG. 2.

With reference first to FIG. 1, the blank labels 20 are initially supplied from the reel 22 in the form of self-adhesive labels mounted on a carrier backing 24. In considering the path of the backing tape 24 and the labels 20, it may be noted that they are fed from the supply reel 22 through the guide 26 past the photocell and light pair 28 to form a loop 30 and then extend upwardly through the guide 32, the pinch roller and drive roller assembly 34, and past the photocell and light pair 36 prior to entering the print station 38. Facing the electrostatic printhead 38 is the web guide 40 and a 'dancer' mechanism 42 which selectively moves the web into engagement with the printhead, or permits it to be spaced slightly away from it, as discussed below. Following the print station 38, the labels are fed to the toner station 44 where the black toner powder is applied to the electrostatically formed image on the labels. A heated platen 46 fuses the toner into the surface of the label.

In accordance with known techniques in the label application field, following the fuse station, the backing strip 24 is sharply bent around the peeling blade 48, thus separating the label from the backing tape; then the label 20 is picked up by the vacuum roller or cylinder 50. The vacuum roller 50 is provided with a series of spaced peripheral grooves 51, which serve both to apply air or vacuum pressure to the labels, and also to permit their removal by the spring fingers 53 which extend into grooves 51, as indicated in FIG. 1-A. When a sensing signal is received, for example from the photocell 52, indicating that the carton 14 is in the proper location, the vacuum roller 50 is actuated to rotate about its axis 55, and the label 20, which is coated with an adhesive material, is stripped from roller 50 by the spring fingers 53, and is firmly applied to the carton 14.

The label shows in the bar code or in the alphanumeric information which has been printed on it, the weight which has previously been determined by the scale 16, forming part of the conveyor system.

Following the stripping of the labels 20 from the backing sheet 24, the backing strip is fed through the advance pinch and drive roller pair 56, through the guide 58 to form an additional loop 60. This loop 60 is maintained by the light and photocell pair 62 acting in conjunction with a motor which drives the take-up reel 64.

In operation, because the labels 20 are relatively close together, at the time that the label shown on the vacuum head 50 is removed from the backing web 24, at least two additional labels have passed the print head 38 or the toner or fuse stations 44 and 46. Accordingly, the pinch roller and drive assembly 34 is energized to pull the webbing back so that the next label is ready for the electrostatic printing station 38. The proper positioning of the labels is insured by the light and photocell pair 36, at the input to the print station. 38.

The mode of operation of the present system will now be further described by reference to the block circuit diagram of FIG. 2. FIG. 2 also shows some of the equipment which appears in FIG. 1, and the same reference numerals are employed in FIG. 2.

Concerning the operation of the supply and take-up reels which were shown at 22 and 64 in FIG. 1, reference is made to the unwind motor 22' which drives the supply reel 22, and the take-up motor 64' which drives the pick-up reel 64. During the printing and application of successive labels, the tape 24 will be moved back and forth between the loops 30 and 60, but the net movement will be from the supply reel 22 to the take-up reel 64. Accordingly, the unwind motor 22' only has to move in one direction to supply additional tape 24 with labels 20 affixed thereto, and the rewind motor 64' only operates in one direction to take up the bare tape 24. As long as the photocell 28 is blocked, the motor 22 is de-energized. However, the photocell 28 is energized when the loop 30 gets short, and the unwind motor is energized by circuit 72 to operate motor 22' until the photocell is once more interrupted. Similarly, when the loop 60 interrupts the photocell 62, then the circuit 72 operates the motor 64' until the loop 60 clears the photocell 62 and permits the photocell to be energized. At this point in time, the take-up motor is turned off until the photocell 62 is again interrupted.

In FIG. 2, the product 14 is shown in the left-hand area on the scale 16. The digitalized output from the scale 16 is fed to data processing circuit 74, representing the host computer, which could for example be an IBM System 7 computer. In addition to other functions which are performed by the host computer, it feeds data indicating the weight of the product 14 over input 76 to the communications display card 78 which is part of the local electronics of the labeling system. The weight and other desired information to be included on the specially prepared label may be displayed by an LED display associated with circuit 78. Block 80 represents the Central Processing Unit and associated memory, and may be implemented by any of the well-known microprocessor systems. Block 82 represents the mechanism interface module and includes the circuitry necessary to interpret the signals provided by the microprocessor and convert them into signals which operate the units shown in FIG. 1. Inputs to the mechanism interface module card 82 include lead 84 from photocell 36 indicating the precise position of the short section of tapes carrying labels between loops 30 and 60, and lead 86 which indicates the position of the product package 14' when it is in the proper position to be labeled.

As disclosed below, the printhead 38 includes both a corona discharge which prints the bar code and an array of wires which print the alpha-numeric information on the label. The five kilovolt supply 88 provides the high voltage for the corona discharge. Ions produced by said discharge are allowed to pass through a slot in the mask by means of a control voltage connected to said mask, which is supplied to lead 90 by control circuit 92 under the control of a low voltage signal applied on lead 94. The signals for the alpha-numeric information require the simultaneous transmission of digital information on bus 96 for each of the many wires included in the array. The wire matrix array is energized at a lower voltage of 700 volts from the supply 98 under the control of circuit 92 through the matrix of leads represented by the bus 100.

As mentioned above, the section of the tape between the loops 30 and 60 has very little inertia, and therefore may be moved forward or backward very rapidly. This may be accomplished either by the two pinch rollers as shown in FIG. 1 or by the single pressure roller 102 mounted between the two rubber covered drive rollers 104 and 106 as shown in FIG. 2. In a forward printing cycle, the solenoid 108 is energized and the roller 102 presses the tape 24 against the rubber coated drive roller 106 and it moves rapidly toward loop 60. Guiding members not shown keep the tape 24 from engaging the driven roller 106 except when roller 102 is moved down. As the next label moves forward, it is charged at print station 38 and is toned and fused at stations 44 and 46 prior to being peeled off by the peeling blade 48. Once the label 20 is detached from the backing web 24, the reverse solenoid 110 is actuated and the roller 103 forces the tape carrying the labels into engagement with the drive roller 104 which promptly moves the tape back in the opposite direction until the next label is in proper position for printing, under control of the photocell 36. Then the cycle as described above repeats, with the supply and take-up motors periodically moving additional tape to maintain the loops 30 and 60 at the desired lengths.

Instead of the single roller 102, the two solenoids 108 and 110 could move the separate pairs of rollers 34 and 56 respectively, as shown in FIG. 1, to pinch the tape and move it either in one direction or the other.

Circuit 112 (FIG. 2) receives the low level signals from computer circuit 82. This circuit 112 supplies the high energy signals, which are necessary to drive the solenoids 108 and 110 as needed.

FIG. 3 shows a simple label including bar code information 114 and the portion 116 which is available for reading by the purchaser or seller of the product. More elaborate printed and legible information may be included on the label including information such as the weight, the date, the type of product, or any other desired information. As mentioned above, the bar code is printed using a corona discharge element, which does not contact the surface of the paper, and the numbers or other legible information is printed using a matrix formed by stylae which in this case are in contact with the paper.

FIG. 4 is a partial cross-sectional view of the electrostatic printhead showing both the corona discharge unit for printing the bar code and also the wire matrix for printing the numbers and other legible information. Initially, with regard to the corona discharge unit, it includes the wire 118 which is maintained at approximately 5000 volts and the shield 120 which substantially encloses it. When it is desired to apply a charge to the label which passes below and slightly spaced from the mask 122, an electric pulse is applied to the mask 122 through the terminal 124. Incidentally, this arrangement is more fully disclosed in related U.S. patent application Ser. No. 740,919, filed Nov. 11, 1976, now U.S. Pat. No. 4,088,891, granted May 9, 1978. The electrostatic charge is applied to the label through the slot 126 in the mask 122, with the slot 126 being vertically aligned with the high voltage wire 118.

The other important component included in the assembly 38 is the matrix printer including two parallel sets of wire 128 and 130. These wires 128 and 130 extend across the face of the unit 38, and are generally coextensive with the slot 126. The individual wires included in the rows of wires 128 and 130 are energized in a timed manner, under the control of the microprocessor, in synchronism with the movement of the label past the printhead 38, to produce the desired numerical information on the label.

FIG. 6 illustrates one possible implementation of the web lifter arrangement by which the labels are brought closer to the printhead and toner, or permitted to be spaced away from these active units by a few thousandths of an inch. In practice, when the lead label is being printed and toned, it is advanced so that it is close to the printhead and also to the toner; however, when the next labels pass under the printhead and the toner unit, and when the toner unit is adjacent the spaces between the die cut labels, the web lifter is dropped to its lower position so that the web and its associated label are slightly spaced from the printhead and from the toner supply.

Now, referring to the details of FIG. 6, the unit 140 actually conforms substantially to the printhead 38, but may also be the toner supply 44. The tape guide 142 is provided with an opening to receive the member 144 which is pivoted at 146. The movement of the pivoted member 144 is controlled by the eccentric or cam 148 which bears on the spring 150. When the cam is in its lower position, the surface 152 drops back to below that of the guide 142; however, when the cam 148 is rotated to the position shown in FIG. 6, the surface 152 extends slightly above the surface of the guide 142 to bias the labels into closer engagement with the unit 140. As indicated in FIG. 2 at reference numerals 154, 154' the cams 148, 148' may be controlled in their movement by a suitable solenoid.

In the foregoing description and in the accompanying drawings, one illustrative embodiment of the invention has been described. It is to be understood, however, that other alternative arrangements may be employed in the implementation of various units or components of the system. Thus, by way of example and not of limitation, other known forms of electrostatic printing could be employed, fan-folded labels could be supplied to the input instead of receiving labels from a reel, with the concurrent advantage of avoiding the need of the input loop 30 as shown in FIGS. 1 and 2, and other forms of label dispensers such as conventional resilient roller dispensers may be used. In addition, for example, the scale 16 may be located at a point more remote from the label application point so that the microprocessor stores the weight information for successive packages and applies it to the proper label in sequence. Also, mechanically operated microswitches could be selectively employed instead of photocells, for sensing the position of the product. Other minor modifications and changes are also considered to be within the scope of the present invention.

What is claimed is:

1. An individualized label application system comprising:
   an electrostatic printing assembly;
   means for guiding a tape carrying pressure-sensitive labels in the forward direction through said electrostatic printing assembly;
   means for dispensing printed labels from said tape and applying them to products;
   means for including individualized information relating to the labeled product on each label;
   means for reversing the movement of said tape and labels by a distance at least equal to the length of one label following the dispensing of a label;
   means for stopping the reverse movement of said tape at a point where another label is ready for electrostatic printing with individualized information for the corresponding product;
   said electrostatic printing means including corona means for printing bar code indicia on said label and wire matrix means for printing alphanumeric information on said label, and means for applying and fixing toner to electrostatic images formed both by said corona and by said matrix electrostatic image-applying means;
   means for weighing each product to be labeled;
   means for including information representing the weight of the product on said printed label;
   means for disabling said electrostatic printing assembly on each forward movement of said tape following printing of the first label, whereby the subsequent adjacent labels which enter the electrostatic printing assembly are not printed until after reverse movement of the tape; and
   said dispensing means including: a grooved cylinder; means for holding said labels onto said cylinder by air pressure; and spring finger means engaging the grooves in said cylinder for stripping said labels from said cylinder as it is rotated and for applying said labels to products.

2. A system as defined in claim 1 further comprising:
   means for providing a low inertia section of tape isolated from the inertia of the label and tape supply and the tape take-up assemblies to facilitate rapid forward and reverse movement of said tape through the electrostatic printing and label dispensing assemblies, and said means for moving said tape in the forward and reverse directions including a high speed pinch roller drive means for alternatively moving said tape in the forward and reverse directions.

3. A system as defined in claim 2 including means for providing loops in said tape on both sides of said electrostatic printing assembly.

4. A system as defined in claim 1 wherein means are provided for moving said tape laterally toward and away from said electrostatic printing assembly.

5. A system as defined in claim 1 wherein said electrostatic printing assembly includes a toner dispensing station, and further comprising means for shifting said tape away from said toner dispensing station between labels, whereby said toner is not applied to said tape in the space between labels.

* * * * *